US009458883B2

(12) United States Patent
Kadono et al.

(10) Patent No.: US 9,458,883 B2
(45) Date of Patent: Oct. 4, 2016

(54) MOTION-GUIDING DEVICE

(71) Applicant: THK CO., LTD., Tokyo (JP)

(72) Inventors: Toshiaki Kadono, Tokyo (JP); Eri Kameda, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/758,840

(22) PCT Filed: Nov. 12, 2013

(86) PCT No.: PCT/JP2013/080554
§ 371 (c)(1),
(2) Date: Jul. 1, 2015

(87) PCT Pub. No.: WO2014/112190
PCT Pub. Date: Jul. 24, 2014

(65) Prior Publication Data
US 2015/0337899 A1 Nov. 26, 2015

(30) Foreign Application Priority Data
Jan. 18, 2013 (JP) .................................. 2013-007113

(51) Int. Cl.
*F16C 29/06* (2006.01)
*F16C 33/38* (2006.01)

(52) U.S. Cl.
CPC ....... *F16C 29/0671* (2013.01); *F16C 29/0609* (2013.01); *F16C 29/0647* (2013.01); *F16C 33/3825* (2013.01)

(58) Field of Classification Search
CPC ............ F16C 29/0609; F16C 29/0671; F16C 29/0611; F16C 33/3825; F16C 29/0647; F16C 33/3706; F16F 43/06
USPC ...................... 384/13, 15, 43, 44, 45, 49, 51
See application file for complete search history.

(56) References Cited

U.S. PATENT DOCUMENTS 3,304,133 A * 2/1967 Strassberg .......... F16C 29/0602
384/44
3,964,802 A * 6/1976 Pitner ................. F16C 29/0607
384/44

(Continued)

FOREIGN PATENT DOCUMENTS

JP        2000120674 A  *  4/2000
JP        2004-293783 A     10/2004

(Continued)

OTHER PUBLICATIONS

International Search Report dated Jan. 14, 2014, issued in corresponding application No. PCT/JP2013/080554 (2 pages).

*Primary Examiner* — Marcus Charles
(74) *Attorney, Agent, or Firm* — Westerman, Hattori, Daniels & Adrian, LLP

(57) ABSTRACT

A motion guide device for preventing interference of belt members with guide grooves. The motion guide device includes an endless circulation path for rolling elements, and a coupling member received in the endless circulation path. The endless circulation path includes a load rolling element path, a rolling element return path, and a direction-changing path. The direction-changing path includes a guide groove for the coupling member, which has an outer circumferential guide surface and an inner circumferential guide surface. The guide groove has a maximum width at a midpoint of a path within a range of from a coupling end between the direction-changing path and the load rolling element path or the rolling element return path to a center portion of the direction-changing path, and the groove width at the coupling end and the groove width at the center portion are smaller than the maximum value of the groove width.

1 Claim, 9 Drawing Sheets

(56) References Cited

U.S. PATENT DOCUMENTS

| | | | | |
|---|---|---|---|---|
| 4,472,003 | A | * | 9/1984 | Osawa ............... F16C 29/064 384/45 |
| 6,155,718 | A | * | 12/2000 | Takamatsu ......... F16C 33/3825 384/45 |
| 7,465,093 | B2 | | 12/2008 | Kato et al. |
| 7,798,718 | B2 | | 9/2010 | Matsumoto et al. |
| 2001/0012415 | A1 | * | 8/2001 | Kasuga ............... F16C 29/0609 384/45 |
| 2002/0067869 | A1 | * | 6/2002 | Michioka ........... F16C 29/0609 384/45 |
| 2004/0213485 | A1 | | 10/2004 | Kato et al. |
| 2006/0159373 | A1 | * | 7/2006 | Matsumoto ......... F16C 29/0609 384/45 |
| 2007/0076989 | A1 | | 4/2007 | Matsumoto et al. |

FOREIGN PATENT DOCUMENTS

| | | | |
|---|---|---|---|
| JP | 2005-133842 A | | 5/2005 |
| JP | 2007-92899 A | | 4/2007 |
| JP | 2007333147 A | * | 12/2007 |
| JP | 2009-127740 A | | 6/2009 |
| JP | 2010-31931 A | | 2/2010 |
| JP | 2012225441 A | * | 11/2012 |

* cited by examiner

MOTION-GUIDING DEVICE

TECHNICAL FIELD

The present invention relates to a motion guide device having a coupling member built into the motion guide device, for aligning a large number of rolling elements at regular intervals inside an endless circulation path for the rolling elements.

BACKGROUND ART

This type of motion guide device includes a track rail having rolling surfaces for rolling elements, which are formed along a longitudinal direction of the track rail, a moving block being mounted on the track rail through intermediation of a large number of rolling elements and having formed therein endless circulation paths for the rolling elements, the large number of rolling elements arrayed inside each of the endless circulation paths, and a belt-like coupling member built into the endless circulation path together with the rolling elements, for aligning the rolling elements in line at regular intervals. Further, the coupling member includes a plurality of spacers each arranged between the adjacent rolling elements, and belt members for coupling the spacers in line at regular intervals. When the moving block reciprocates relative to the track rail, the rolling elements are caused to circulate through the endless circulation path, and the coupling member is also caused to circulate through the endless circulation path together with the rolling elements.

The endless circulation path includes a load rolling element path through which the rolling elements are caused to roll while being subjected to a load between the track rail and the moving block, a rolling element return path formed in parallel to the load rolling element path, and a pair of direction-changing paths each connecting the load rolling element path and the rolling element return path. Each direction-changing path is formed into an arc shape having a constant curvature radius so that an advancing direction of the rolling elements and the coupling member is reversed. Further, guide grooves corresponding to the belt portions of the coupling member are formed in inner walls of the load rolling element path, the rolling element return path, and the direction-changing paths along a circulating direction of the rolling elements. The coupling member is caused to circulate through the endless circulation path under a state in which the belt portions are inserted into the guide grooves. Each guide groove of the direction-changing path has its curvature center matched with the curvature center of the direction-changing path, and is formed into an arc shape having a constant curvature radius similarly to the direction-changing path.

When the coupling member is moved through the direction-changing path, the belt member is not curved into the arc shape conforming to the guide groove, but is curved into a shape analogous to the arc of the guide groove while being locally bent between the spacers adjacent to each other. Therefore, when the coupling member is moved through the direction-changing path, the belt member is liable to interfere with an outer circumferential surface of the guide groove, thereby causing a risk in that an excess sliding resistance is applied to the coupling member located inside the direction-changing path. The invention disclosed in Patent Literature 1 is provided in consideration of such interference between the belt member and the guide groove. In this invention, the curvature center of the outer circumferential surface of the guide groove is set closer to an outer circumferential surface of the direction-changing path than the curvature center of the direction-changing path, with the result that the width of the guide groove is gradually increased as approaching from both end portions of the direction-changing path to a center portion thereof, and is set to a maximum groove width at the center portion.

CITATION LIST

Patent Literature

[PTL 1] JP 2009-127740 A

DISCLOSURE OF THE INVENTION

Problems to be Solved by the Invention

The present invention has an object to provide a motion guide device capable of preventing interference of the belt members of the coupling member with the guide grooves to smoothly circulate the belt members through the direction-changing path, thereby being capable of smoothly circulating the rolling elements through the endless circulation path.

Means for Solving the Problems

In order to achieve the above-mentioned object, according to one embodiment of the present invention, there is provided a motion guide device, including: a track rail on which rolling elements are caused to roll along a longitudinal direction of the track rail; and a moving block being mounted on the track rail through intermediation of a large number of the rolling elements, having formed therein endless circulation paths for the rolling elements, and being freely movable along the track rail. Each of the endless circulation paths includes: a load rolling element path through which the rolling elements are caused to roll while bearing a load between each of the rolling elements and the track rail; a rolling element return path formed in parallel to the load rolling element path; and direction-changing paths each connecting the load rolling element path and the rolling element return path to each other. Further, a plurality of the rolling elements arrayed inside the each of the endless circulation paths are retained by a coupling member including: spacers each arranged between the rolling elements adjacent to each other; and belt members for coupling the spacers to each other.

In addition, the each of the endless circulation paths has guide grooves formed therein, for guiding the belt members of the coupling member along a circulating direction of the each of the rolling elements. One of the guide grooves formed in each of the direction-changing paths has an outer circumferential guide surface and an inner circumferential guide surface opposed to the outer circumferential guide surface. Each of the outer circumferential guide surface and the inner circumferential guide surface is formed into a smoothly continuous shape. Further, a groove width of the one of the guide grooves formed in the each of the direction-changing paths is set to a maximum value at a midpoint of a path within a range of from a coupling end between the each of the direction-changing paths and the load rolling element path or the rolling element return path to a center portion of the each of the direction-changing paths. The groove width at the coupling end and the groove width at the center portion are set smaller than the maximum value of the groove width at the midpoint of the path.

Effects of the Invention

According to the motion guide device of the one embodiment of the present invention, even when the belt member is bent inside the direction-changing path, the belt member can be prevented from interfering with the guide groove formed in the direction-changing path. As a result, it is possible to achieve smooth circulation of the rolling elements through the endless circulation path and therefore achieve smooth movement of the moving block along the track rail.

MODE FOR CARRYING OUT THE INVENTION

Now, a motion guide device according to an embodiment of the present invention is described in detail with reference to the accompanying drawings.

Figure 1:
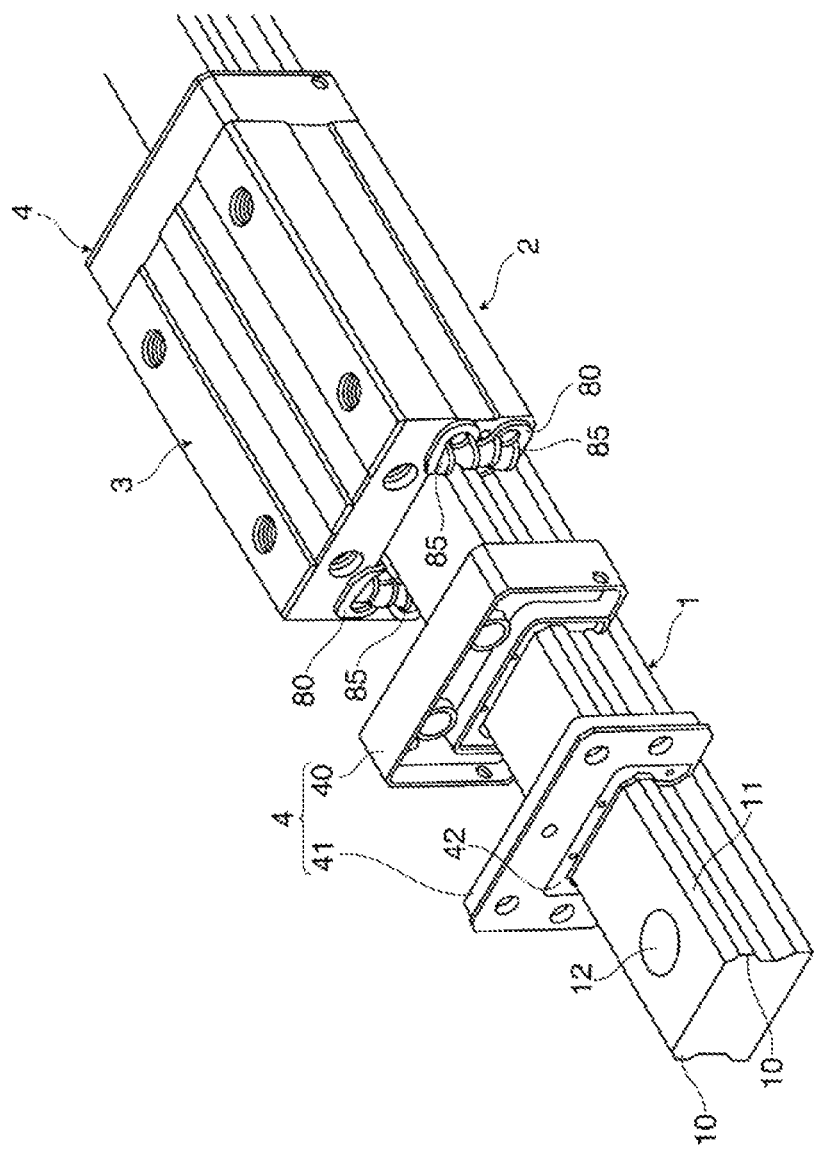
FIG. 1 is a perspective view of an example of a motion guide device according to an embodiment of the present invention.

FIG. 1 is an illustration of an example of the motion guide device according to the embodiment of the present invention. The motion guide device includes a track rail 1 extending linearly, and a moving block 2 being mounted on the track rail 1 through intermediation of a large number of balls serving as rolling elements and having formed therein endless circulation paths for the balls. The moving block 2 is movable along the track rail 1 in a freely reciprocable manner. Note that, in the illustration of FIG. 1, the balls arrayed inside each of the endless circulation paths are omitted to facilitate understanding of the overview of the track rail 1 and the moving block 2.

The track rail 1 is formed into a substantially rectangular shape in cross section. Projecting portions 10 are formed on both right and left side surfaces of the track rail 1 along a longitudinal direction thereof. Ball rolling grooves 11 are formed above and below each projecting portion 10. A total of four ball rolling grooves 11 are formed in the track rail 1. Further, bolt fixing holes 12 are formed in the track rail 1 at predetermined intervals along the longitudinal direction to penetrate from an upper surface of the track rail 1 to a bottom surface thereof. The bolt fixing holes 12 are used when the track rail 1 is to be laid on machinery or the like. Note that, the arrangement of the ball rolling grooves 11 on the track rail 1 and the number of the ball rolling grooves 11 may be changed as appropriate depending on bearing capacity necessary for the moving block 2.

On the other hand, the moving block 2 includes a block assembly 3 for receiving a part of the track rail 1, and a pair of end plates 4 mounted on both ends of the block assembly 3 in a reciprocating direction thereof. Each of the endplates 4 includes an end plate main body 40, and a seal retaining plate 41 fixed to the endplate main body 40. A seal member 42 is mounted on the seal retaining plate 41 to seal a gap between the end plate 4 and the track rail 1, thereby preventing dust or the like adhering to the track rail 1 from entering the inside of the moving block 2. Note that, in FIG. 1, a state in which one end plate 4 is removed from the block assembly 3 and disassembled into the endplate main body 40 and the seal retaining plate 41 is illustrated.

Figure 2:
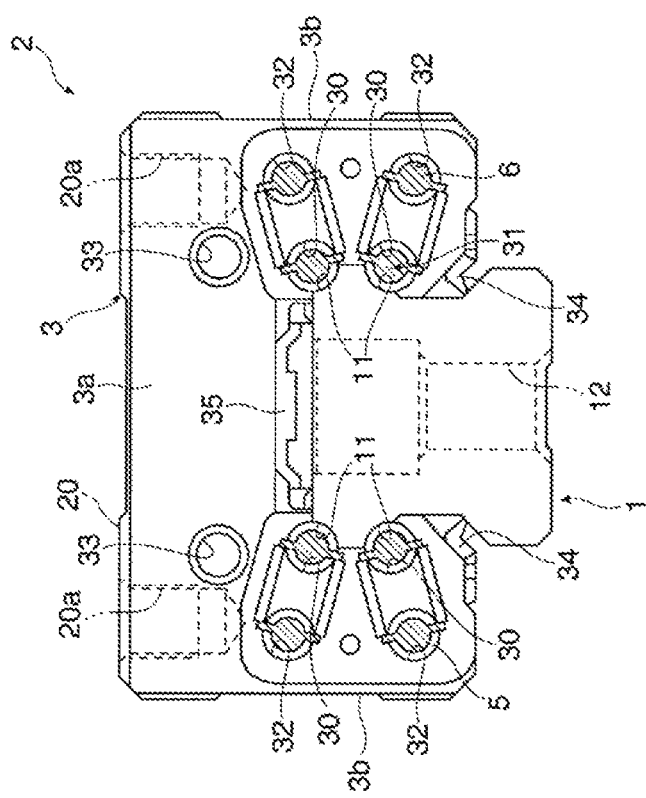
FIG. 2 is a front view of a state in which an end plate is removed from the motion guide device illustrated in FIG. 1.

FIG. 2 is a front view of the motion guide device in a state in which the end plate 4 is removed. The block assembly 3 includes a horizontal portion 3a having a mounting surface 20 for an object to be conveyed, such as a table, and a pair of leg portions 3b orthogonal to the horizontal portion 3a and opposed to both the side surfaces of the track rail 1. The block assembly 3 receives an upper half of the track rail 1 in a space between the pair of leg portions 3b. Further, the mounting surface 20 has tapped holes 20a for fixing the object to be conveyed with bolts.

Two load ball rolling grooves 30 are formed on an inner side of each leg portion 3b facing the track rail 1. The load ball rolling grooves 30 are opposed to the ball rolling grooves 11 of the track rail 1 to form load rolling element paths 31 through which balls 5 are caused to roll while bearing a load. Further, each leg portion 3b has a rolling element return path 32 formed substantially in parallel to each load rolling element path 31. The inner diameter of the rolling element return path 32 is set slightly larger than the diameter of each ball 5 so that the ball 5 is caused to roll through the rolling element return path 32 under a state of being released from the load.

Note that, in FIG. 2, reference symbol 33 represents a tapped hole to be used for fixing the end plate 4, reference symbol 34 represents a seal member for sealing a gap between the side surface of the track rail 1 and the leg portion 3b of the block assembly 3, and reference symbol 35 represents a seal member for sealing a gap between the upper surface of the track rail 1 and the horizontal portion 3a of the block assembly 3.

Further, the endplate 4 together with the block assembly 3 forms a direction-changing path as a part of the endless circulation path. The direction-changing path is formed into an arc shape having a constant curvature radius to couple the load rolling element path 31 and the rolling element return path 32 to each other, thereby being capable of causing the balls 5 to travel between the load rolling element path 31 and the rolling element return path 32. That is, as illustrated in FIG. 1, the pair of end plates 4 is mounted on the block assembly 3 to complete the endless circulation path for the balls 5.

In addition, the balls 5 are arrayed in line at regular intervals on a belt-like coupling member 6. The balls 5 together with the coupling member are built into the endless circulation path formed by the load rolling element path 31, the rolling element return path 32, and the direction-changing paths. Note that, in the illustration of FIG. 2, the balls 5 arrayed in the direction-changing path and the coupling member 6 located therein are omitted, but the cross section of the coupling member 6 in each of the load rolling element path 31 and the rolling element return path 32 is illustrated.

Figure 3:
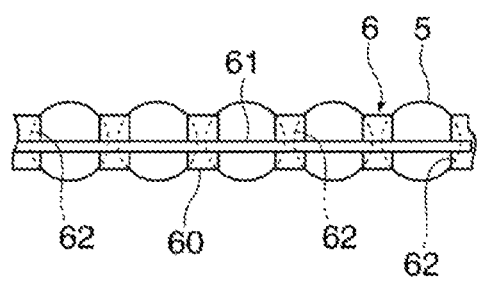
FIG. 3 is a side view of a coupling member to be built into the motion guide device illustrated in FIG. 1.
Figure 4:
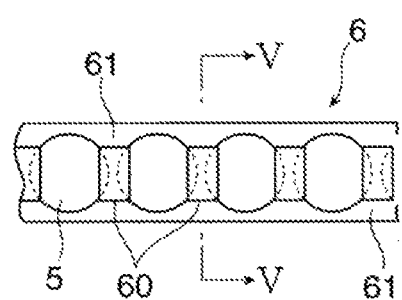
FIG. 4 is a plan view of the coupling member illustrated in FIG. 3.
Figure 5:
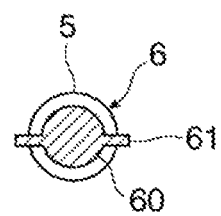
FIG. 5 is a sectional view taken along the line V-V of FIG. 4.

FIG. 3 to FIG. 5 are illustrations of the coupling member 6. The coupling member 6 includes a plurality of spacers 60 each arranged between the balls 5, and a pair of belt members 61 extending along an array direction of the balls 5, for coupling the spacers 60 to each other. Each spacer 60 is formed into a disc shape, and has a spherical seat 62 formed on a surface of the spacer 60 that is brought into contact with the ball 5. The spherical seat 62 has a curvature approximate to that of the spherical surface of the ball 5. Further, each of the belt members 61 is formed into a flat band shape having flexibility. The pair of belt members 61 are arranged across the spacers 60 and coupled to the spacers 60. Therefore, the belt member 61 is not easily deflected at a portion that is coupled to the spacer 60, but is easily deflected at a portion that is not coupled to the spacer 60, namely, at a portion between the spacers 60 adjacent to each other. Thus, when the coupling member 6 is forcibly curved inside the direction-changing path, the coupling member 6 is not curved into a smooth arc shape, but is curved into a pseudo-arc shape involving partial bending. Further, as illustrated in FIG. 3, the belt member 61 is coupled to the spacers 60 at positions slightly offset from centers of the balls 5. When the coupling member 6 is to be built into the endless circulation path of the moving block 2, the posture of the coupling member 6 to be built into the moving block 2 is determined so that the belt member 61 is located on an inner side of the circulation path with respect to the centers of the balls 5.

The spacers 60 and the belt members 61 of the coupling member 6 are integrally manufactured by injection molding with a synthetic resin, and each of the balls 5 is inserted between the spacers 60 after the coupling member 6 is manufactured. The ball 5 inserted between the pair of spacers 60 is embraced by the spacers 60, and is retained by the coupling member in a freely rotatable state. Further, each spacer 60 is brought into contact with the ball 5 at the spherical seat 62, and hence, under a state in which the coupling member 6 is curved inside the endless circulation path of the moving block 2, the center of the spherical seat 62 of the spacer 60 is always positioned on a line segment connecting the centers of the balls 5 adjacent to each other.

Figure 6:
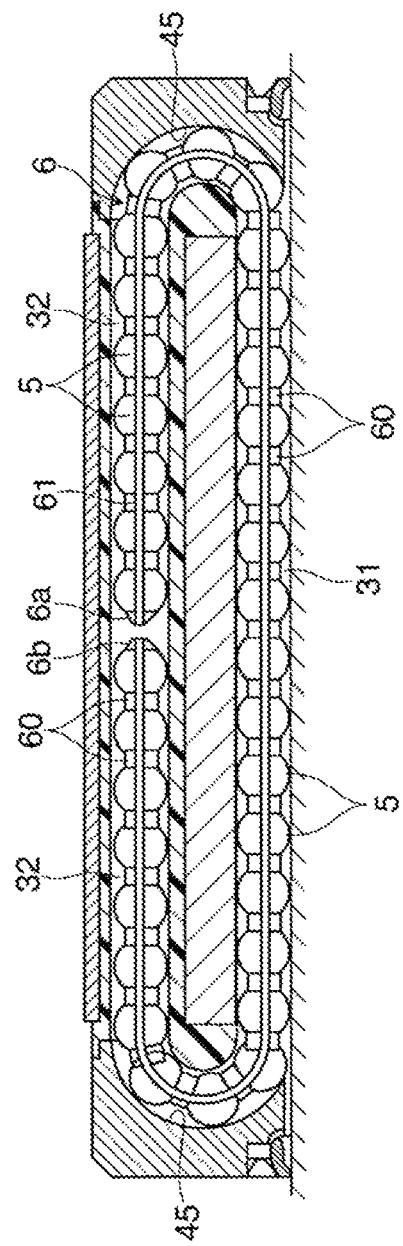
FIG. 6 is a sectional view of a state in which balls and the coupling member are built into an endless circulation path.

FIG. 6 is a sectional view of the coupling member 6 built into the endless circulation path. The endless circulation path is formed by coupling the load rolling element path 31 and the rolling element return path 32 to each other through a pair of direction-changing paths 45. In each direction-changing path 45 having an arc shape, an advancing direction of the balls 5 is reversed so that the balls are introduced from the load rolling element path 31 to the rolling element return path 32 or from the rolling element return path 32 to the load rolling element path 31. In the endless circulation path, end portions 6a and 6b of the coupling member 6 are opposed to each other via a clearance secured therebetween, and hence the end portions do not interfere with each other even when the coupling member 6 is slightly stretched. Thus, when the moving block 2 is moved along the track rail 1, the balls 5 located inside the load rolling element path 31 are caused to roll, with the result that all the balls 5 located inside the endless circulation path are caused to circulate through the endless circulation path together with the coupling member 6.

Figure 7:
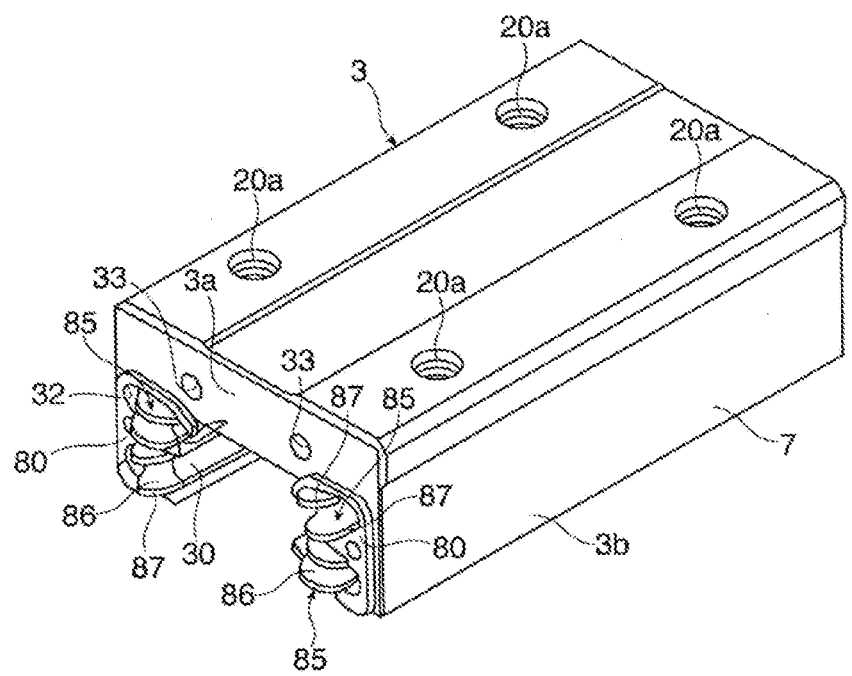
FIG. 7 is a perspective view of a block assembly of the motion guide device illustrated in FIG. 1.
Figure 8:
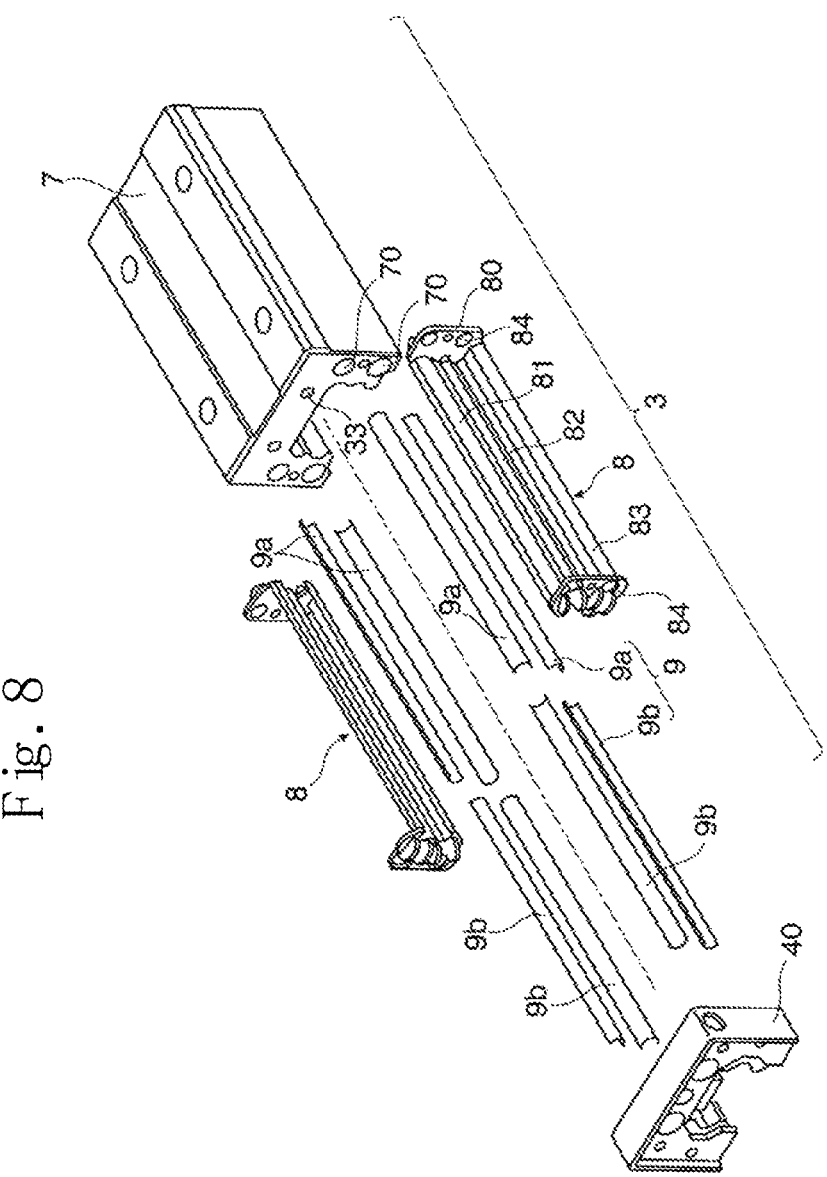
FIG. 8 is an exploded perspective view of the block assembly illustrated in FIG. 7.

Next, the structures of the block assembly 3 and the end plate 4 are described in detail. FIG. 7 is a perspective view of the block assembly 3, and FIG. 8 is an exploded view of the block assembly 3. The block assembly 3 includes a block main body 7 being made of a metal and having the load ball rolling grooves 30 formed thereon, a pair of circulation members 8 made of a synthetic resin and mounted on the block main body 7, and four pipe members 9 mounted on the block main body 7 to form the rolling element return paths 32.

The block main body 7 has mounting holes 70 formed through the block main body 7 along a moving direction of the moving block 2. Each of the pipe members 9 includes a pair of pipe segments 9a and 9b formed into a substantially semi-circular shape in cross section. The pipe members 9 are inserted into the mounting holes 70 to form the rolling element return paths 32. Further, although the illustration is omitted from FIG. 7 and FIG. 8, guide grooves for receiving the belt members 61 of the coupling member 6 are formed in inner walls of each of the pipe members 9.

Further, the circulation member 8 is arranged corresponding to each leg portion 3b of the block assembly 3. The circulation member 8 includes a pair of inner plates 80 to be brought into contact with both end surfaces of the block main body 7, and three retaining frames 81, 82, and 83 for coupling the inner plates 80 to each other. Each inner plate 80 is formed into a flat-plate shape that covers a part of the end surface of the block main body 7, and has pipe retaining holes 84 through which the pipe members 9 are to be inserted. Each of the pipe retaining holes 84 serves as an inlet or outlet of the rolling element return path 32. Further, each inner plate 80 has two guide protrusions 85 formed adjacent to the pipe retaining holes 84. Each guide protrusion 85 protrudes from a surface of the inner plate 80 to have a semi-circular shape, and is molded integrally with the inner plate 80. In addition, each guide protrusion 85 has an inner circumferential curved surface 86 formed along a circumferential surface thereof to have a constant curvature radius. One end of the inner circumferential curved surface 86 is continuous with the load ball rolling groove 30, whereas the other end of the inner circumferential curved surface 86 is continuous with the rolling element return path 32. Further, a pair of inner circumferential guide surfaces 87, with which the belt members 61 of the coupling member 6 are to be brought into slidable contact, are formed on both sides of the inner circumferential curved surface 86. The inner circumferential guide surfaces 87 correspond to outer circumferential edges of the guide protrusion 85.

On the other hand, the first retaining frame 81 is formed along an upper end edge of the upper load ball rolling groove 30 out of the two load ball rolling grooves 30 formed in the leg portion 3b, whereas the second retaining frame 82 is formed to be positioned in the middle of the two load ball rolling grooves 30. Further, the third retaining frame 83 is positioned at a lower end of the leg portion 3b and formed along a lower end edge of the lower load ball rolling groove 30. In addition, guide grooves for receiving the belt members 61 of the coupling member 6 are formed at portions of the retaining frames 81, 82, and 83 facing the load ball rolling grooves 30. Each guide groove is positioned on both sides of the load ball rolling groove 30 to form paths of the belt members 61 of the coupling member 6.

Figure 9:
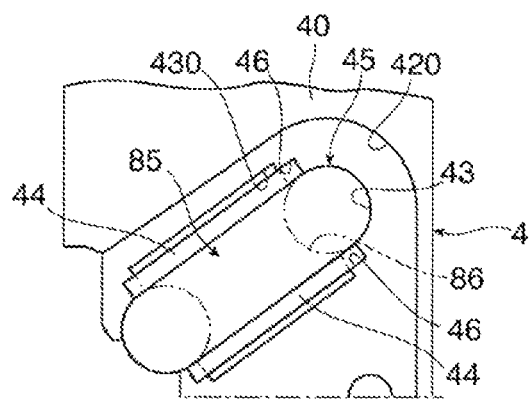
FIG. 9 is a partially enlarged view of a surface of the end plate to be joined to the block assembly.

On the other hand, FIG. 9 is a detailed view of a surface of the end plate 4 to be joined to the block assembly 3. A plate fixing recess 420 having the same shape as that of the inner plate 80 of the circulation member 8 is formed in a surface of the end plate main body 40 to be joined to the block assembly 3. When the endplate main body 40 is fixed to the block assembly 3, the inner plate 80 is fitted into the plate fixing recess 420 so that the inner plate 80 is positioned. In addition, the inner plate 80 is sandwiched between the end plate main body 40 and the block main body 7 so that the inner plate 80 is fixed. Further, a protrusion receiving groove 430, into which the guide protrusion 85 of the inner plate 80 is to be fitted, is formed inside the plate fixing recess 420. The protrusion receiving groove 430 has an outer circumferential curved surface 43 to be opposed to the inner circumferential curved surface 86 of the guide protrusion 85. When the end plate 4 is mounted on the block assembly 3, the inner circumferential curved surface 86 of the guide protrusion 85 and the outer circumferential curved surface 43 of the protrusion receiving groove 430 are combined with each other so that the direction-changing path 45 having an inner diameter slightly larger than the diameter of the ball 5 is formed between the inner circumferential curved surface 86 and the outer circumferential curved surface 43. In addition, the protrusion receiving groove 430 and the guide protrusion 85 are combined with each other so that guide grooves 46 for receiving the belt members 61 of the coupling member 6 are formed in the direction-changing path 45. Each of the guide grooves 46 has an outer circumferential guide surface 44 to be opposed to the inner circumferential guide surface 87. Note that, in FIG. 9, the guide protrusion 85 on the block assembly 3 side is indicated by the two-dot chain line to clearly locate the direction-changing path 45.

Figure 10:
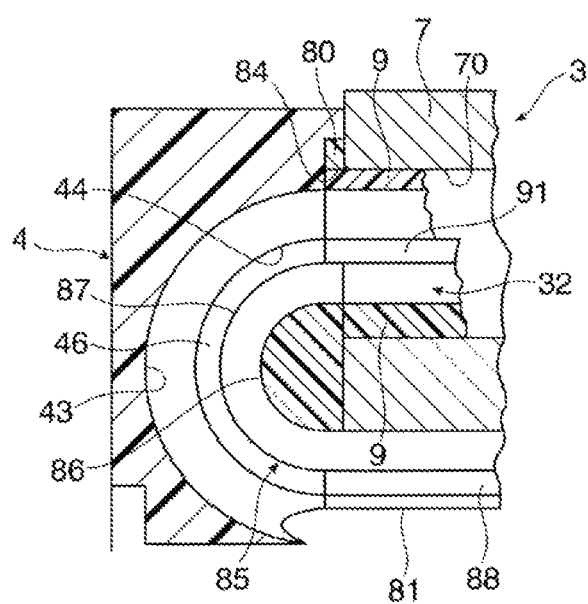
FIG. 10 is a sectional view of a state in which the endplate is mounted on the block assembly.

FIG. 10 is a sectional view of a state in which the end plate 4 is mounted on the block assembly 3 to complete the direction-changing path 45. The outer circumferential curved surface 43 of the end plate 4 is formed into a semi-circular shape continuous with the rolling element return path 32. The outer circumferential curved surface 43 is formed into an arc shape having the same curvature center as that of the inner circumferential curved surface 86 and also having a curvature radius larger than the curvature radius of the inner circumferential curved surface 86 by an amount slightly larger than the diameter of the ball. When the end plate 4 is mounted on the block assembly 3, the inner circumferential curved surface 86 of the guide protrusion 85 and the outer circumferential curved surface 43 are opposed to each other so that the direction-changing path 45 having a semi-circular shape connecting the load rolling element path 31 and the rolling element return path 32 to each other is completed between the inner circumferential curved surface 86 and the outer circumferential curved surface 43. Further, the outer circumferential guide surface 44 and the inner circumferential guide surface 87 are opposed to each other so that the guide groove 46 for receiving the belt member 61 of the coupling member 6 is formed in the direction-changing path 45.

In addition, a part of the pipe member 9 inserted into the mounting hole 70 of the block main body 7 protrudes from the mounting hole 70, and is fitted into the pipe retaining hole 84 formed in the inner plate 80 of the circulation member 8. Thus, the pipe member 9 and the end plate 4 are accurately positioned through intermediation of the inner plate 80, and as illustrated in FIG. 10, a guide groove 88 formed in each of the retaining frames 81, 82, and 83 of the circulation member 8, the guide groove 46 formed in the end plate 4, and a guide groove 91 formed inside the pipe member 9 are accurately coupled to each other. That is, when the endplate 4 is mounted on the block assembly 3, the guide groove 88 formed in the load rolling element path 31, the guide groove 46 formed in the direction-changing path 45, and the guide groove 91 of the rolling element return path 32 are coupled to each other so that the guide groove for receiving the belt member 61 of the coupling member 6 is completed to be continuous in a circumferential direction of the endless circulation path for the balls 5.

Figure 11:
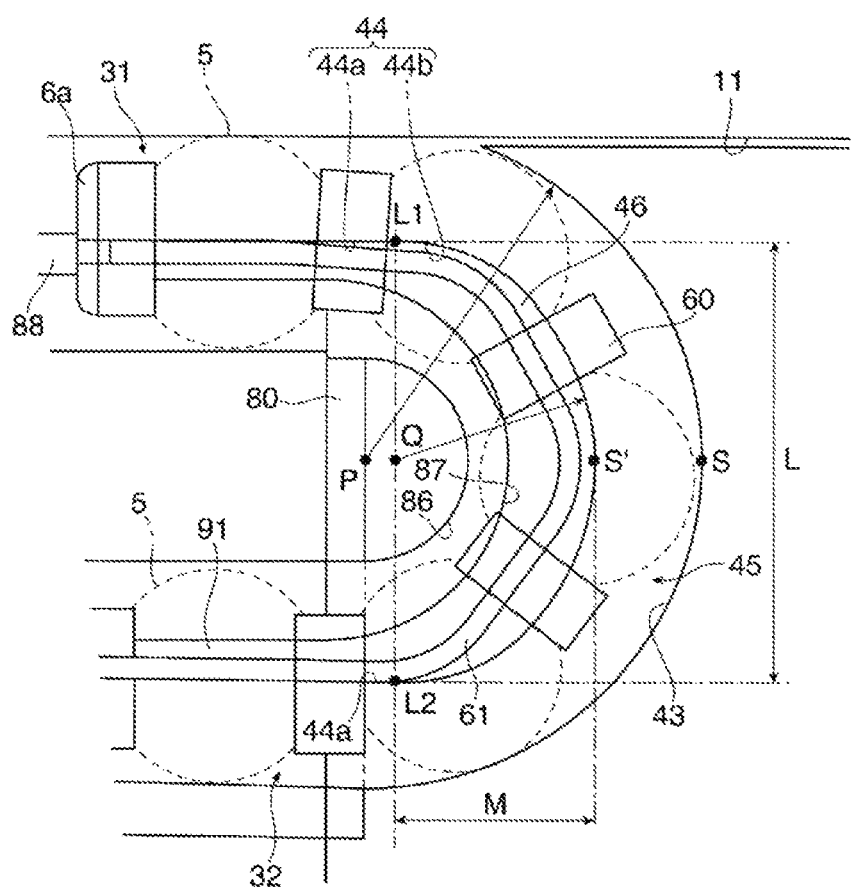
FIG. 11 is an enlarged view of a curved state of the coupling member located inside a direction-changing path.

FIG. 11 is an enlarged view of the inside of the direction-changing path 45. The outer circumferential curved surface 43 is formed into a simple-arc shape having a center of the arc at a point P on the surface of the inner plate 80. The balls 5 are moved in an arc shape through the direction-changing path 45 along the outer circumferential curved surface 43. When a rolling direction of the balls 5 rolling through the load rolling element path 31 is set as a reference, the rolling direction of the balls 5 is brought into a state of being changed by 90° at a position S equidistant from the load rolling element path 31 and the rolling element return path 32 (hereinafter referred to as "center portion S of direction-changing path"). Further, the rolling direction of the balls 5 rolling through the rolling element return path 32 is brought into a state of being changed by 180°. Note that, in FIG. 11, each of the balls 5 located inside the direction-changing path 45 is indicated by dashed line to facilitate understanding of the track of the coupling member 6 inside the direction-changing path 45.

On the other hand, as described above, the belt member 61 of the coupling member 6 is not easily deflected at the portion that is coupled to the spacer 60, but is easily deflected at the portion between the spacers 60 adjacent to each other. Thus, inside the direction-changing path, the coupling member 6 is not curved into a smooth arc shape along the path of movement of the balls, but is curved into a pseudo-arc shape involving partial bending. In particular, as illustrated in FIG. 3, the belt member 61 of the coupling member 6 is coupled to the spacers 60 while being offset from the centers of the balls 5. Besides, when the belt member 61 is located on the inner side of the endless circulation path with respect to the centers of the balls 5 as illustrated in FIG. 11, the partial bending of the belt member 61 occurs conspicuously inside the direction-changing path 45.

Therefore, if the outer circumferential guide surface 44 of the guide groove 46 is formed into an arc shape having the same curvature center as that of the outer circumferential curved surface 43 and also having a constant curvature radius, the partially bending portion of the belt member 61 may significantly interfere with the outer circumferential guide surface 44. The interference between the belt member 61 and the outer circumferential guide surface 44 occurs more conspicuously in the process of the change in the advancing direction of the balls by 90°, namely, in the path within a range of from the load rolling element path 31 or the rolling element return path 32 to the center portion S of the direction-changing path 45 (hereinafter referred to as "turning path") than in the center portion S of the direction-changing path 45.

Figure 12:
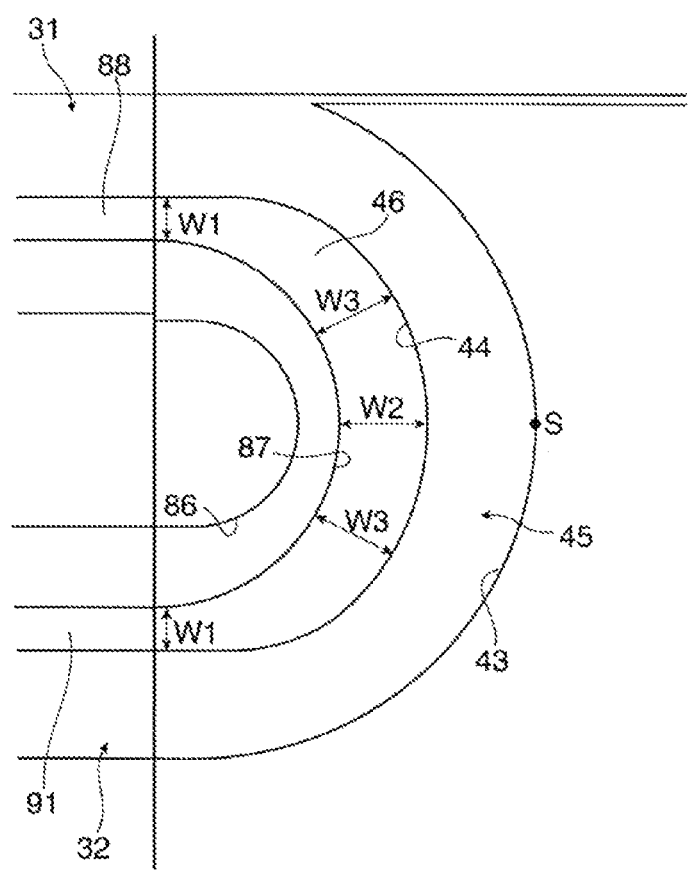
FIG. 12 is a schematic view of groove widths of a guide groove formed inside the direction-changing path.

In view of this point, in the motion guide device according to the present invention, as illustrated in FIG. 12, the groove width of the guide groove 46 in the direction-changing path 45 is continuously changed within a range of from a portion coupled to the guide groove 88 of the load rolling element path 31 to a portion coupled to the guide groove 91 of the rolling element return path 32. The groove width of the guide groove 46 herein refers to a distance between the outer circumferential guide surface 44 and the inner circumferential guide surface 87 opposed to each other.

Further, when the groove width of the guide groove 46 is represented by W1 at the portion coupled to the guide groove 88 of the load rolling element path 31 or the portion coupled to the guide groove 91 of the rolling element return path 32, W2 at the center portion S of the direction-changing path 45, and W3 at a midpoint of the turning path, W3 is set larger than W1 and W2.

That is, in the motion guide device of the present invention, the groove width of the guide groove 46 is set to a maximum value at the midpoint of the turning path. For example, the groove width is gradually increased and then gradually decreased in the course in which the coupling member 6 enters the direction-changing path 45 from the load rolling element path 31 and reaches the center portion S of the direction-changing path.

To realize the guide groove 46 having the groove width thus optimized in view of the actual shape of the belt member 61 located inside the direction-changing path 45, this embodiment provides the following shapes for the outer circumferential guide surface 44 and the inner circumferential guide surface 87, which are opposed to each other to form the guide groove 46. Note that, the following example of the shapes of the outer circumferential guide surface 44 and the inner circumferential guide surface 87 is only an example, and the shapes of the outer circumferential guide surface 44 and the inner circumferential guide surface 87 for realizing the above-mentioned guide groove 46 are not limited to the following shapes.

As illustrated in FIG. 11, in this embodiment, the inner circumferential guide surface 87 of the guide groove 46 is formed into a smooth arc shape having a constant curvature radius, and the curvature center of the inner circumferential guide surface 87 is matched with the curvature center P of the outer circumferential curved surface 43 that is guiding the balls 5. On the other hand, the outer circumferential guide surface 44 includes a pair of straight portions 44a each continuous with the guide groove 91 formed in the load rolling element path 31 or the guide groove 88 formed in the rolling element return path 32, and a turning portion 44b for coupling the pair of straight portions 44a to each other. The pair of straight portions 44a and the turning portion 44b are smoothly continuous with each other. Each straight portion 44a is formed in conformity with the rolling direction of the balls 5 rolling through the load rolling element path 31 or the rolling element return path 32 to guide the belt member 61 along with the movement of the moving block 2.

The turning portion 44b is formed into a semi-elliptic shape having a center set at a point Q. The shape of the turning portion 44b is different from the shape of the inner circumferential guide surface 87. The center Q of the semi-elliptic shape is positioned on a line segment connecting the curvature center P of the inner circumferential guide surface 87 and the center portion S of the direction-changing path, and is also positioned between the curvature center P and the inner circumferential curved surface 86 of the direction-changing path 45. Further, the major axis of the semi-elliptic shape of the turning portion 44b corresponds to a line segment having a length L and connecting coupling points L1 and L2 between the turning portion and the pair of straight portions 44a, and the center Q of the semi-elliptic shape is located on this line segment. On the other hand, when S' represents a vertex of the turning portion 44b corresponding to the center portion S of the direction-changing path 45, the minor axis of the semi-elliptic shape of the turning portion 44b corresponds to a line segment having a length M and connecting the vertex S' and the center Q, and this line segment is matched with the moving direction of the moving block 2.

As described above, the inner circumferential guide surface 87 of the guide groove 46 is formed into an arc shape having a constant curvature radius, whereas the outer circumferential guide surface 44 is formed into a complex shape including the straight portions 44a and the turning portion 44b having a semi-elliptic shape. Thus, the groove width of the guide groove 46 is set to the maximum value at the midpoint of the turning path so that W3 can be set larger than W1 and W2.

In this case, if the turning portion 44b is not formed into a semi-elliptic shape but is formed into an arc shape having a constant curvature radius, and if the curvature center is matched with the above-mentioned center Q of the semi-elliptic shape, the groove width of the guide groove 46 is gradually increased as approaching from a coupling end between the direction-changing path 45 and the load rolling element path 31 or the rolling element return path 32 to the center portion S of the direction-changing path 45, and is set to a maximum value at the center portion S. Thus, as long as the turning portion 44b is formed into an arc shape having a constant curvature radius, the setting of the guide groove 46 of the present invention cannot be realized.

Further, according to the motion guide device of this embodiment as described above, the groove width of the guide groove 46 for the coupling member 6 in the direction-changing path 45 is set to the maximum value at the midpoint of the turning path. As a result, even when the belt member of the coupling member is curved into a pseudo-arc shape while being partially bent in the guide groove, the belt member 61 can be prevented from significantly interfering with the outer circumferential guide surface 44 of the guide groove 46. Therefore, the balls 5 can be caused to circulate smoothly through the endless circulation path due to the structure capable of preventing the interference between the belt member 61 and the outer circumferential guide surface 44 in the direction-changing path 45. Thus, the moving block 2 can be moved smoothly relative to the track rail 1.

Further, to provide the above-mentioned groove width for the guide groove 46 of the direction-changing path 45, various shapes may be conceived as the shape of the outer circumferential guide surface 44 of the guide groove 46. However, when the outer circumferential guide surface 44 is formed of the straight portions 44a and the turning portion 44b and the turning portion 44b is formed into a semi-elliptic shape as in the motion guide device of this embodiment, the end plate having the outer circumferential guide surface is molded easily, thereby being capable of reducing the production cost of the entire motion guide device.

On the other hand, as illustrated in FIG. 6, the ball 5 is not interposed between the end portions 6a and 6b of the coupling member 6 that are opposed to each other in the endless circulation path, and hence each of the end portions 6a and 6b is not caused to circulate through the direction-changing path 45 while following the ball 5. Therefore, even when the end portions 6a and 6b are located inside the direction-changing path, the belt member 61 tends to extend linearly without being bent between each of the end portions 6a and 6b and the spacer 60 adjacent thereto. For this reason, each of the end portions 6a and 6b may excessively interfere with the outer circumferential guide surface 44 when entering the direction-changing path 45 and traveling toward the center portion S.

However, as described above, in the motion guide device of this embodiment, the groove width of the guide groove 46 is set to the maximum value at the midpoint of the turning path, and hence the groove width having the maximum value at the midpoint of the turning path is gradually decreased as approaching to the center portion S of the direction-changing path. Therefore, each of the end portions 6a and 6b can be caused to enter the center portion S under a state of being oriented in a direction close to a direction perpendicular to the ball rolling groove 11 of the track rail 1. Thus, it is possible to reduce a contact angle of each of the end portions 6a and 6b with respect to a part of the outer circumferential guide surface 44 that is formed at the center portion S. As a result, it is possible to prevent excessive interference of each of the end portions 6a and 6b with the outer circumferential guide surface 44.

In the motion guide device of the present invention as described above, there is conceived a case where the belt member 61 of the coupling member 6 mainly interferes with the outer circumferential guide surface 44 of the guide groove 46 when the coupling member 6 retaining the balls 5 passes through the direction-changing path 45. This situation is liable to occur when the balls 5 rolling through the load rolling element path 31 apply, to the coupling member 6, a force in a direction of pushing the coupling member 6 into the direction-changing path. However, depending on the positions of the end portions of the coupling member 6 inside the endless circulation path, the balls 5 rolling through the load rolling element path 31 may apply, to the coupling member 6, a force in a direction of pulling the coupling member 6 out of the direction-changing path 45. In this case, it is conceived that the belt member 61 of the coupling member 6 interferes with the inner circumferential guide surface 87 of the guide groove 46.

In the motion guide device according to the above-mentioned embodiment, the inner circumferential guide surface 87 of the guide groove 46 is formed into an arc shape having a constant curvature radius with its curvature center set at the point P. Considering the interference between the belt member 61 and the inner circumferential guide surface 87, it is preferred that the design of the shape of the inner circumferential guide surface 87 be changed as appropriate in conformity with the circulation track of the belt member 61. Note that, considering the bending of the belt member 61 inside the direction-changing path 45, the groove width of the guide groove 46 is set on the premise that the groove width has a maximum value at the midpoint of the turning path within the range of from the coupling end between the direction-changing path and the load rolling element path or the rolling element return path to the center portion S of the direction-changing path, and that the groove width at the coupling end and the groove width at the center portion are smaller than the maximum value of the groove width at the midpoint of the path.

Note that, the above-mentioned embodiment has described the example in which the ball is used as the rolling element. However, the rolling element is not limited to the ball, and a roller may be used instead. In this case, depending on the shape of the roller to be used, the sectional shape of the rolling surface for the rolling element may be set to a shape of a curved rolling groove similarly to the case of the ball, or may be set to a shape of a simple planar rolling surface.

Further, the above-mentioned embodiment relates to a linear guide device having the track rail 1 formed into a linear shape. However, the present invention is also applicable to, for example, a curved guide device having the track rail 1 formed into a curved shape as long as the device is a motion guide device having an endless circulation path for balls.

The invention claimed is:

1. A motion guide device, comprising:
a track rail on which rolling elements are caused to roll along a longitudinal direction of the track rail; and
a moving block being mounted on the track rail through intermediation of a large number of the rolling elements, having formed therein endless circulation paths for the rolling elements, and being freely movable along the track rail,
wherein each of the endless circulation paths comprises:
a load rolling element path through which the rolling elements are caused to roll while bearing a load between each of the rolling elements and the track rail;
a rolling element return path formed in parallel to the load rolling element path; and
direction-changing paths each connecting the load rolling element path and the rolling element return path to each other,
wherein a plurality of the rolling elements arrayed inside the each of the endless circulation paths are retained by a coupling member comprising:
spacers each arranged between the rolling elements adjacent to each other; and
belt members for coupling the spacers to each other,
wherein the each of the endless circulation paths has guide grooves formed therein, for guiding the belt members of the coupling member along a circulating direction of the each of the rolling elements,
wherein one of the guide grooves formed in each of the direction-changing paths has an outer circumferential guide surface and an inner circumferential guide surface opposed to the outer circumferential guide surface, each of the outer circumferential guide surface and the inner circumferential guide surface being formed into a smoothly continuous shape,
wherein a groove width of the one of the guide grooves formed in the each of the direction-changing paths is set to a maximum value at a midpoint of a path within a range of from a coupling end between the each of the direction-changing paths and the load rolling element path or the rolling element return path to a center portion of the each of the direction-changing paths,
wherein the groove width at the coupling end and the groove width at the center portion are set smaller than the maximum value of the groove width at the midpoint of the path,
wherein the outer circumferential guide surface comprises:
a pair of straight portions extended from the load rolling element path and the rolling element return path, respectively, and
a turning portion having a curved shape, for coupling the pair of straight portions to each other, and
wherein the turning portion is formed into a semi-elliptic shape having a minor axis matched with a direction of movement of the moving block along the track rail.

* * * * *